Patented Oct. 9, 1928.

1,686,913

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

PURIFICATION OF BENZOIC ACID AND ITS DERIVATIVES.

No Drawing. Application filed October 18, 1927. Serial No. 227,063.

This invention relates to the purification of benzoic acid and its derivatives and more particularly to the separation of benzoic acid and substituted benzoic acids from the corresponding phthalic acids.

When benzoic acid or its derivatives are prepared from the corresponding phthalic anhydrides or by a single operation from naphthalene by catalytic oxidation and splitting of $CO_2$, it is frequently contaminated with greater or less amounts of phthalic acids, depending on the processes used. Similarly, substituted benzoic acids prepared by analogous processes are contaminated by the corresponding substituted phthalic acids. The separation of these two products presents some difficulty when straight sublimation is used, as phthalic acid is transformed into phthalic anhydride which is relatively volatile.

According to the present invention, a mixture of benzoic and phthalic acids are subjected to sublimation in the presence of or treatment with steam at a temperature below that at which the phthalic acids are transformed into the corresponding anhydrides. In the case of unsubstituted benzoic and phthalic acid this temperature is approximately 191° C. It is possible, of course to use temperatures above the critical temperature, but if this temperature is notably exceeded the steam will carry with it not only benzoic acid, which is volatile with steam, but also considerable amounts of phthalic acid or rather phthalic anhydride. In its preferred embodiment the present invention is however directed to steam sublimation treatments at temperatures below the critical temperature for the phthalic acid in question which result in the most complete separations.

The steam, with or without admixture with other gases such as air, $CO_2$, $N_2$, etc., may be introduced into the mixture of benzoic and phthalic acids in the form of superheated steam or saturated steam under any suitable pressure. In general for practical operation the temperature of the steam should be higher than 100° C. The benzoic and phthalic acid mixture may be maintained at a temperature approximating that of the steam or the steam may be used to heat the mixture in which case it is usually introduced at a higher temperature. A water solution of benzoic and phthalic acids may also be distilled under pressure in which case the steam is formed immediately in contact with the acids but except where the two acids are obtained in such a solution I prefer to introduce the steam in the vapor phase. This also permits a continuous instead of a batch process by providing suitable means for withdrawing phthalic acid from the mixture. Such a continuous process may for example be effected by causing a hot solution of the benzoic and phthalic acids to flow in countercurrent to a stream of steam at approximately the same or higher temperature. The steam can preferably be superheated. Another very effective method is to vaporize the benzoic phthalic acid mixture and to blow it into a re-action chamber with a current of steam or counter to such a current suitably provisions being made to intimately mix and agitate the two streams and to provide for sufficient cooling so that the temperature is reduced below 191° C. Phthalic acid will precipitate out and can be suitably removed and the steam mixed with benzoic acid vapors may be permitted to escape from the reaction vessel, the benzoic acid being suitably removed therefrom by condensation or by treatment with reagents. Another effective means is to spray a benzoic phthalic acid solution or suspension into a chamber where it contacts with a blast of steam or the steam may be used to effect the spraying. In either case an intimate contact of the steam with the acid mixture is obtained and the temperature maintained at a point below 191° C. The phthalic acid condenses out and the steam and benzoic acid mixture may be removed from the reaction vessel and the benzoic acid suitably separated. Of course, instead of using steam alone it may be diluted with any other gas, such as for example air, carbon dioxide, nitrogen and the like and in fact in any of the modifications of the present invention it is possible to dilute the steam with gases which are substantially inert toward benzoic acid at the temperature of treatment.

The steam-benzoic acid vapors may be cooled to condense benzoic acid or a strong water solution of benzoic acid while the bulk of the water remains in the vapor stage or all of the water may be condensed and then the benzoic acid removed by any suitable well known means. If desired the benzoic acid may be absorbed or caused to react with chemicals such as alkalies to remove it from the steam stream. Solvents for benzoic acid, which are immiscible with water may also be issued to separate benzoic acid therefrom.

A particularly effective method consists in cooling the steam-benzoic acid vapor mixture to a point at which a large proportion or most of the benzoic acid condenses with a relatively small amount of water or substantially no water at all and then recirculate the remaining steam which may contain small amounts of benzoic acid after suitable adjustment of its temperature. In this way it is possible to condense out benzoic acid at a temperature sufficiently high to prevent a great deal of water being carried down with it and at the same time there is no loss of benzoic acid which may still remain in the vapor form as this residual vapor is again passed through the benzoic and phthalic acid mixture and is thus not lost.

When benzoic acid is produced from phthalic anhydride by the catalytic splitting off of one carboxyl group, for example by passing vapors of the phthalic anhydride, preferably admixed with steam, over a suitable catalyst at a high temperature or by catalytically reducing and splitting phthalic anhydride with hydrogen, the gases leaving the catalytic converter contain benzoic acid and phthalic anhydride together with water vapors in the first process, and in the second process may also contain benzaldehyde and small amounts of benzyl alcohol. The first process is described in my co-pending application, Serial No. 223,845, filed October 3rd, 1927 and the latter process is described in my copending application Serial No. 287,901, filed June 23, 1928. Either of these reaction gases may be treated with steam at such a temperature that the resultant mixture is below 191° C. in the case of unsubstituted benzoic or phthalic acid or the corresponding temperature in the case of substituted benzoic and phthalic acids. In some cases it may also be desirable to introduce a certain amount of water in the liquid state to effect the cooling or, of course, wet steam may be used, in both cases the phthalic acid condenses out and the vapor stream contains mainly benzoic acid, carbon dioxide, and water in the one case and benzoic acid, carbon dioxide, water, benzaldehyde and in some cases benzyl alcohol and other reaction products in the other case depending on the reaction conditions. The vapors may then be cooled to condense out benzoic acid which may be slightly contaminated with benzaldehyde if that compound is present. When benzaldehydes are present they may be separated by any suitable manner as for example by separation with bisulfites, which will remove benzaldehyde and the like. The reaction mixture may also be passed through high boiling solvents for the products which it is desired to remove.

Where products desired are separated from the stream without condensing all of the steam the carbon dioxide may be again reused in the process after suitable temperature adjustment if necessary. Where the phthalic anhydride vapors have been mixed with a sufficient amount of steam, it is possible to effect separation merely by cooling down the vapors below 191° C. the steam contained therein being sufficient to maintain the benzoic acid in the form of a vapor.

The invention will be described in greater detail with specific examples, which follow.

*Example 1.*

A mixture of benzoic and phthalic acid containing approximately 85% benzoic acid and 15% phthalic acid is heated to a temperature between 150 and 175° C. and superheated steam at approximately the same temperature or slightly higher temperature is passed through. Benzoic acid sublimes off with the steam and can be removed therefrom by fractional condensation or any other suitable means. When the benzoic acid is separated out by fractional condensation the steam may be reused, if necessary after being heated to the desired temperature.

*Example 2.*

A mixture of orthochlorbenzoic and the corresponding monochlorphthalic acid is heated to a temperature below that in which the phthalic acid is transformed into the anhydride or becomes unduly volatile with steam and superheated steam at approximately the same temperature is passed through. The chlorbenzoic acid sublimes over substantially free from chlorphthalic acid and may be separated from the steam in any suitable manner, as for example by fractional condensation.

*Example 3.*

The effluent gases from a converter in which phthalic anhydride vapors and steam are passed over a carboxyl splitting catalyst at 400-420° C. which gases contain phthalic anhydride and benzoic acid in the proportion of about 20 to 80 or higher are treated with steam or a mixture of steam and water in sufficient quantity to reduce the temperature below 191° C. The phthalic acid condenses out and the benzoic acid remains in the vapor phase, where it can be separated by fractional condensation or by any other suitable means as by continuous treatment with organic solvents such as benzol, toluol and the like. Instead of producing benzoic acid from phthalic anhydride, it may be produced in a single operation from naphthalene by subjecting the latter to vapor phase catalytic oxidation to produce phthalic anhydride then causing the reacted gases to contact with a carbon dioxide splitting catalyst with the addition of sufficient steam to carry out the reaction. The steam may, of course be mixed with the original naphthalene vapors if desired.

Example 4.

The effluent gases from a converter in which phthalic anhydride vapors and hydrogen or other reducing gases such as water gas, CO etc., are passed over reduction and carbon dioxide splitting catalysts, which gases contain benzoic acid, phthalic anhydride, some benzaldehyde and traces of benzyl alcohol together with carbon dioxide, water, and in some cases excess reducing gas are treated with steam in an amount and at a temperature sufficient to cool the whole mixture to a temperature below 191° C. The phthalic acid condenses out while the benzoic acid remains in vapor form and can be removed by fractional condensation or by any suitable means and if necessary purified by separation from any contaminating benzaldehyde or other reaction product.

Example 5.

A hot solution of benzoic and phthalic acids is sprayed through a nozzle into a treatment chamber using superheated steam as a spraying medium, the temperature in the chamber being maintained at about 170° C. and suitable baffles being provided to intimately mix the steam with the sprayed acid mixture. Phthalic acid condenses out and can be removed from the treating chamber either periodically or continuously in the form of a solid, containing very little, if any, water. The steam carrying with it substantially all of the benzoic acid vapors permitted to pass out from the treatment chamber through a suitable opening preferably baffled to prevent the passage of mechanically entrained phthalic acid. The vapors can be cooled to a temperature somewhat above the boiling point of water whereupon most of the benzoic acid condenses out carrying with it little, if any, water and the steam after suitable superheating can be reused. Instead of fractional condensation the steam benzoic acid mixture can be passed through hot high-boiling solvents for benzoic acid, the temperature being maintained above 100° C. Any other suitable means may be used. If desired the steam may be diluted with inert gases such as air, nitrogen, carbon dioxide and the like.

Example 6.

A mixture of benzoic acid and phthalic anhydride is vaporized and blown into a vessel counter to a blast of superheated steam, the temperature in the vessel being maintained below 191° C. The colliding streams of vapor are intimately mixed, if necessary by the provision of suitable baffling, and phthalic acid precipitates out. The steam, together with substantially all of the benzoic acid vapors, is permitted to pass out of the vessel and is suitably treated to remove benzoic acid therefrom, as described in the foregoing examples.

This application is in part a continuation of my co-pending application, Serial No. 223,845, filed October 3, 1927.

What is claimed as new is:

1. A method of separating benzoic acids from phthalic acids which comprises subjecting a mixture containing benzoic acids and phthalic acids to the action of steam at a temperature not substantially above that at which the phthalic acids are substantially transformed into the anhydrides, permitting the steam and benzoic acid vapors to leave the mixture and separating the benzoic acids from these vapors.

2. A method according to claim 1 in which the mixture contains unsubstituted phthalic and benzoic acid and the steam treatment is carried out at a temperature below 191° C.

3. A method of separating benzoic acid from mixtures containing benzoic acids and phthalic acids which comprises passing steam through the mixture at a temperature below that at which the phthalic acids are substantially transformed into the anhydrides whereby the phthalic acids are condensed, fractionally condensing at least a major portion of the benzoic acids from the benzoic acid steam stream.

4. A method according to claim 3 in which the fractional condensation takes place above the boiling point of water and the remaining steam after adjustment of its temperature is reused in the process.

5. A method of separating benzoic acids from effluent gas mixtures containing benzoic acids and phthalic anhydrides, which comprises subjecting said effluent gases to steam at a temperature and in amount sufficient to reduce the temperature of effluent gases below a temperature at which phthalic anhydrides are transformed into acids whereby phthalic acids are condensed out of the gas stream and removing the benzoic acids from the gas stream.

6. A method of removing benzoic acid from effluent gases from a catalytic converter in which phthalic anhydride vapors have been treated with hydrogen in the presence of a contact mass containing at least one carbon dioxide splitting catalyst, which effluent gases contain phthalic anhydride, benzoic acid and benzaldehyde, which comprises subjecting such effluent gas to the action of sufficient steam at a sufficiently low temperature to reduce the temperature of the gases below the point at which phthalic anhydride is transformed into phthalic acid in the presence of steam, permitting the phthalic acid thus produced to condense out and removing benzoic acid and benzaldehyde from the vapor stream.

7. A method of preparing benzoic acids from mixtures containing benzoic acids and phthalic acids, which comprises introducing a dispersion of the mixture forcibly into a reaction chamber and into contact with a rapidly moving stream containing steam, the temperature of the dispersion and steam stream and the reaction chamber being maintained continuously below the temperature at which phthalic acids are transformed into anhydrides whereby the phthalic acids precipitate, removing the phthalic acid from the reaction chamber permitting vapors of benzoic acid mixed with the steam stream to leave the reaction chamber and removing benzoic acid from said vapors.

8. A method according to claim 7 in which an aqueous solution of benzoic and phthalic acids is sprayed into a reaction chamber by means of steam.

9. A method according to claim 7 in which an aqueous solution of benzoic acids and phthalic acids are sprayed into a reaction chamber into contact with an oppositely directed blast of steam.

Signed at Pittsburgh, Pennsylvania, this 15th day of October, 1927.

ALPHONS O. JAEGER.